Sept. 15, 1936.    H. FRANCIS, JR    2,054,369
SEALING MEANS
Filed Dec. 29, 1933

INVENTOR
H. Francis, Jr.
BY
ATTORNEY

Patented Sept. 15, 1936

2,054,369

UNITED STATES PATENT OFFICE 2,054,369

SEALING MEANS

Harry Francis, Jr., Philadelphia, Pa., assignor to Baldwin-Southwark Corporation, a corporation of Delaware Application December 29, 1933, Serial No. 704,441

4 Claims. (Cl. 251—11)

This invention relates generally to pivotal valves and more particularly to improved means for sealing a valve casing and pivotal valve element around the pivot shafts whereby pipe line fluid is prevented from leaking around the pivot shafts from one side of the valve to the other when in its closed position.

In valves, especially of the butterfly type, it is often desirable and sometimes necessary to have the valve as nearly leakproof as possible in its closed position. While considerable progress has been made in the development of means for sealing the periphery of butterfly valves, yet adequate means have heretofore not been available for preventing leakage from one side of the valve to the other around the valve stem. Various means have heretofore been proposed for this purpose, but they are very ineffective or expensive, if not difficult for installation and maintenance.

It is one object of my invention to provide improved means for sealing the valve around its operating stem or pivot shafts. Another object is to provide an improved sealing means that is highly effective in providing a uniform sealing action and pressure around the pivot shafts and of insuring that when the sealing pressure is partially or wholly removed from the packing means that the same will be restored to a uniform condition as far as the texture of the packing material is concerned.

In one specific aspect of the invention I accomplish the foregoing objects by providing a metallic sleeve axially slidable of the pivot shaft, this sleeve carrying a rubber element preferably vulcanized to the metallic sleeve and having axial and radial sealing surfaces whereby upon application of an operating force such as fluid pressure to the top of the metallic sleeve, the rubber is expanded radially and compressed axially so that it has sealing contact with the valve casing and pivot and also with the top of the valve disc and yet upon release of the pressure the sealing contact will be sufficiently reduced to permit movement of the valve without destroying the rubber element. It will, of course, be understood that any other equivalent compressible material may be used instead of rubber.

Other objects and advantages will be more apparent to those skilled in the art from the following description of the accompanying drawing in which.

Figure 1:
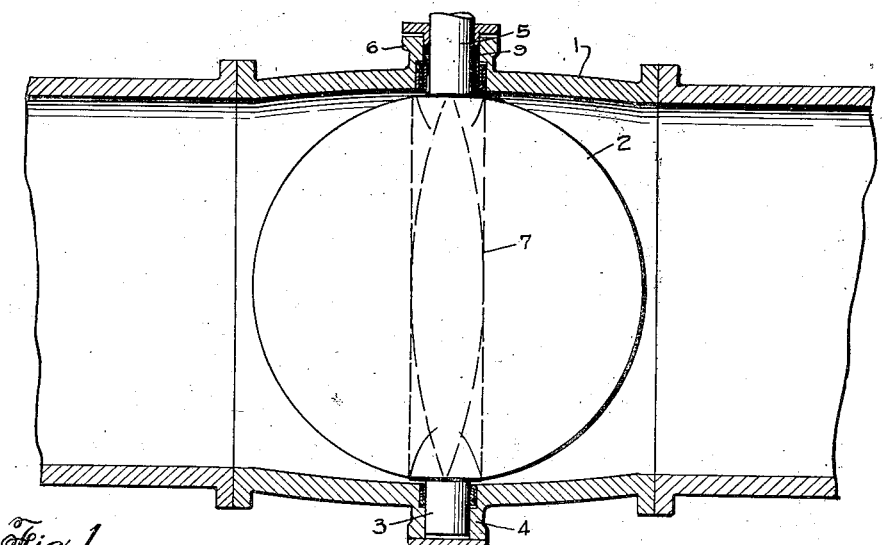
Fig. 1 is a longitudinal sectional view through a butterfly valve installed in a pipe line and embodying features of my invention.
Figure 2:
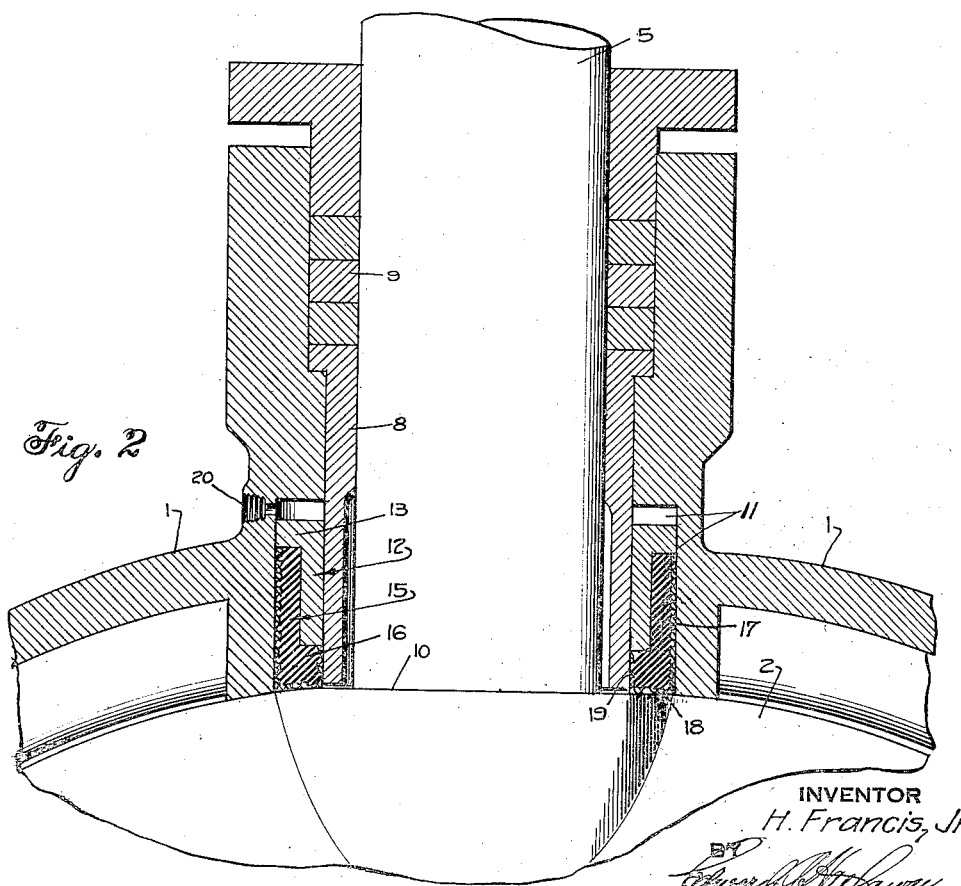
Fig. 2 is an enlarged vertical section of a fragmentary portion of the valve at the point where the valve stem extends through the casing.

In the particular embodiment of the invention which is disclosed herein merely for the purpose of illustrating one specific form among possible others that the invention might take, I have shown in Fig. 1 any conventional type of valve casing 1 having a cylindrical inner periphery adapted to be closed by a valve disc 2 commonly known as a butterfly valve. This valve is shown in its open position. As is usual the valve is provided with a lower pivot shaft or pintle 3 journalled in a bearing 4 while an upper operating shaft 5 projects entirely through a bearing housing 6. A usual bearing sleeve 8 for shaft 5 may if desired include a packing gland 9. The bearing 8 normally extends down to a flat top surface 10 of a valve disc 2. The upper end of the shaft is connected to any suitable actuating mechanism for rotating the valve disc 2 to its open or closed position, the closed position being shown in dotted lines at 7.

Any suitable means may be employed for sealing the periphery of the valve when in its closed position, one such means being a rubber tubular member such as shown in Sheppard Patent No. 1,813,126. However, to completely seal the valve against flow from one side to the other, it is necessary to provide adequate sealing means around the pivot shafts 3 and 5. To accomplish this, I have provided an annular recess 11 formed in the valve casing 1 concentrically of shaft 5. The sealing device includes a sleeve generally indicated at 12 having an annular flange 13 while a rubber sleeve generally indicated at 15 has an annular flange 16. The rubber sleeve is thus substantially complementary to sleeve 12 which is preferably of bronze or other suitable metallic material. The member 15 is preferably cured to the surface of metallic sleeve 12 and if desired the three sealing surfaces 17, 18 and 19 of the rubber may have a fabric lining embedded therein.

It will be noted that the sealing surface 19 is adapted to engage the outer lower periphery of bearing 8, the sealing surface 18 engaging the top flat surface 10 of the valve disc while the sealing surface 17 is engageable with the wall of annular recess 11. The result is that upon axial movement of sleeve 12, the rubber sleeve 15 will be compressed to force its surface 18 into sealing contact with the valve surface 10 and will also expand radially both at the surfaces 17 and 19, thereby effectively sealing the space between the bearing 8 and casing 1. Any suitable sealing means that might be employed around the periphery of valve disc 2 would be brought as close as possible to the sealing means around the pivot shaft shown herein, thereby forming a complete seal.

To apply axial force to the sealing device, I preferably admit fluid pressure, from any suitable source such as the upstream side of the pipe line in which the valve is disposed, through an inlet 20 to the annular recess 11 to act on the top of sleeve 13 and sufficiently move the same downwardly to compress and expand the rubber sleeve and thus seal the valve around its pivot shaft when the valve is in closed position. When it is desired to move the valve, the sealing pressure is sufficiently released to reduce or remove the sealing force at the contacting surfaces of the seal.

It will, of course, be understood that this sealing arrangement is also applied to the lower valve stem 3 so as to provide a complete seal for both of the valve pivots. Hence it is seen that I have provided an extremely simple and effective means for sealing the valve against leakage from one side to the other around the pivot shafts which have heretofore constituted a very annoying and difficult point to adequately seal.

It will of course be understood that various changes in details of construction and arrangement of parts may be made by those skilled in the art without departing from the spirit of the invention as set forth in the appended claims.

I claim:

1. A valve mechanism comprising, in combination, a casing, a pivotal valve member disposed therein and having a pivot shaft, a metallic sleeve movable axially of said shaft and a rubber element vulcanized to said sleeve, and means for axially moving said sleeve to compress said rubber element on top of said pivotal valve and expand the rubber element radially.

2. A valve mechanism comprising, in combination, a casing, a valve disc pivotally supported therein by a pivot shaft, said casing having an annular recess surrounding said shaft with opposed cylindrical walls terminating adjacent the edge of said valve disc, a flanged metallic sleeve slidably supported by one of said annular walls, a rubber sleeve complementary to said metallic sleeve and vulcanized thereto, and means for moving said metallic sleeve axially to compress said rubber sleeve and thereby effect a sealing action between the cylindrical walls of said annular recess and the edge of said valve disc.

3. The combination set forth in claim 2 further characterized by the provision of a fluid pressure chamber at one end of said metallic sleeve whereby upon admission of fluid pressure said sleeve is moved axially to effect said sealing action.

4. A valve mechanism comprising, in combination, a casing, a pivotal valve member disposed therein and having a pivot shaft, a metallic sleeve movable axially of said shaft, resilient sealing means secured to said sleeve, and means for axially moving said sleeve to compress said sealing means on top of said pivotal valve and expand the sealing means radially.

HARRY FRANCIS, Jr.